United States Patent Office 2,786,075
Patented Mar. 19, 1957

2,786,075

ADDUCTS OF HEXAMETHYLPHOSPHOROUS TRIAMIDE AND POLYHALO COMPOUNDS

Herbert J. Krase, Dayton, Ohio, and William T. Dye, Jr., Decatur, Ala., assignors to Monsanto Chemical Company, St. Louis, Mo., a corporation of Delaware No Drawing. Application September 9, 1954, Serial No. 455,086

6 Claims. (Cl. 260—551)

The present invention relates to organic phosphorus compounds and more particularly provides new adducts of certain hexaalkylphosphorous triamides and certain halogen-containing compounds.

According to the invention there are prepared new and valuable adducts of a hexaalkylphosphorous triamide having from 1 to 4 carbon atoms in the alkyl radical and an organic chlorine compound having from 1 to 8 carbon atoms and selected from the class consisting of chlorinated alkanes, chlorinated phenylalkanes, and chlorinated nitroalkanols having at least three chlorine atoms attached to the same carbon atom; chlorofluoroalkanes having at least two chlorine atoms and at least one fluorine atom attached to the same carbon atom; cycloalkenes carrying chlorine as a substituent on each of the nuclear olefinic carbon atoms and on the other nuclear carbon atoms a halogen selected from the class consisting of chlorine and fluorine; chlorinated fatty aldehydes having an α-chlorine atom; chlorinated dialkyl and alkyl aryl ketones having an α-chlorine atom; hydrocarbon esters of α-chloro fatty acids, nitriles of α-chloro acids; and chlorinated nitroalkanes in which the chlorine and nitro radicals are attached to the same carbon atom. The hexaalkylphosphorous triamides are known compounds which are readily obtainable by reaction of the appropriate dialkylamine with phosphorous trichloride. We have found that when such triamides are contacted with the above-defined organic chlorine compounds, there are formed addition products in which one mole of the chlorine-containing compound is combined with from one to six moles of the triamide.

As examples of chlorinated alkanes, phenylalkanes, and nitrophenylalkanols having at least 3 chlorine atoms attached to the same aliphatic carbon atom and useful in the preparation of the present adducts may be mentioned:

Carbon tetrachloride
Chloroform
Hexachloroethane
1,1,1-trichloroethane
1,1,1-trichloro-3-methylbutane
3,3,3-trichloro-2-methylpropane
1,1,1,2-tetrachloroethane
1,1,1-trichloropropane
1,1,1,2-tetrachlorobutane
1,1,1,2-tetrachloropropane
Pentachloroethane
1,1,1,2,3,3-hexachloropropane
1,1,1,2,2-pentachloro-3-methylbutane
1,1,1,2,2,3,3-heptachloropropane
Octachloropropane
1,1,1,2,2-pentachlorohexane Benzotrichloride
2-chlorobenzotrichloride
1,1,1-trichloro-2,2-bis-(2-chlorophenyl)ethane
1,1,1-trichloro-2,2-diphenylethane
1,1,1-trichloro-3-nitropropan-2-ol
1,1,1-trichloro-3-nitrobutan-2-ol
1,1,1-trichloro-3-nitropentan-2-ol Presently useful chlorofluoroalkanes having at least two chlorine atoms and at least one fluorine atom attached to the same carbon atom are:

Difluorodichloromethane
Fluorotrichloromethane
1,1-difluorotetrachloroethane
1,2-difluorotetrachloroethane
Octachlorodifluorobutane
1,1-dichlorotetrafluoroethane
1,1,2,3,4,4-hexachloro-1,2,3,3-tetrafluorobutane Examples of α,α-dichlorocycloalkenes carrying as substituents on the other nuclear carbon atoms a halogen selected from the class consisting of chlorine and fluorine are:

1,1-dichlorooctafluoro-1,2-cyclohexene
Octachlorocyclopentene
1,2,4,4-tetrachloro-3,3,5,5-tetrafluoro-1,2-cyclopentene
1,2-dichloro-3,3,4,4,5,5-hexafluoro-1,2-cyclopentene
1,2,3,4,4,5-hexachloro-3,5-difluoro-1,2-cyclopentene
Hexachlorocyclopentadiene Chlorinated fatty aldehydes having a chlorine substituent in the α-position with respect to the aldehyde carbonyl radical are, for example:

Chloroacetaldehyde
Dichloroacetaldehyde
α,α,β-Trichloro-n-butyraldehyde
α,α,β-Trichloropropionaldehyde
α,α-Dichloropropionaldehyde
α-Chloroisobutyraldehyde
α-Chloropropionaldehyde Examples of presently useful chlorinated dialkyl and alkyl aryl ketones having a chlorine substituent at an aliphatic carbon atom which is in the α-position with respect to the carbonyl radical are:

1-chloropropan-2-one
1,1-dichloropropan-2-one
1,1,1-trichloropropan-2-one
1,3-dichlorobutan-2-one
1,3-dichloropropan-2-one
1,1,3,3-tetrachloropropan-2-one
1,1,1,3-tetrachloropropan-2-one
Pentachloropropan-2-one
Hexachloropropan-2-one
2-chloro-2-methylbutan-3-one
3-chloropentan-2-one
1-chlorobutan-2-one
α-Chloroacetophenone
α,α-Dichloroacetophenone
α,α,α-Trichloroacetophenone
Hexachloroacetone
α-Chloropropiophenone
α-Chloro-4-methylacetophenone
α-Chloro-4-butylacetophenone
3-chloro-4-phenylbutan-2-one
1-chlorooctan-2-one Esters of α-chloro fatty acids which are useful in preparing the present adducts are, for example:

Phenyl chloroacetate
Ethyl chloroacetate
Methyl chloroacetate
Methyl dichloroacetate
Cyclohexyl chloroformate
n-Amyltrichloroacetate
Isopropyl dichloroacetate
Ethyl α,β-dichloropropionate
Ethyl α,α,β-trichloro-n-butyrate
Isoamyl trichloroacetate
Isopropenyl chloroacetate
n-Butyl α-chloropropionate
Ethyl α-chlorovalerate
Benzyl chloroacetate Examples of the presently useful nitriles of α-chloro fatty acids are:

Chloroacetonitrile
Dichloroacetonitrile
α,β-Dichloropropionitrile
α,α,β-Trichloropropionitrile Chloronitroalkanes useful in preparing the present adducts are those in which a chlorine atom and a nitro-radical are attached to the same carbon atom, e. g.:

1,1-dichloro-1-nitroethane
1,1-dichloro-1-nitropropane
2-chloro-2-nitropropane
1-chloro-1-nitropropane As examples of useful hexaalkylphosphorous triamides which are reacted with the above halogen compounds to yield the present adducts may be mentioned hexamethylphosphorous triamide, hexaethylphosphorous triamide, hexa-n-propylphosphorous triamide, hexaisobutylphosphorous triamide and such mixed hexaalkylphosphorous triamides as tetramethyldiethylphosphorous triamide, dimethyldiethylphosphorous triamide, dimethyldiethyldibutylphosphorous triamide, etc.

The present adducts are generally stable, well-defined products which range from viscous liquids to crystalline solids. They are almost all water-soluble, and many are extremely deliquescent. While we do not know the structural formula of all the adducts, the high water-solubility and elemental analyses of some of them show such adducts to be phosphonium halides of the type

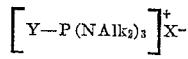

in which Y is a residue of the organic chlorine compound defined above, X is chlorine, and Alk denotes an alkyl radical of from 1 to 4 carbon atoms. When there are present in the initial organic chlorine-containing compound a plurality of activating chlorine atoms there may be formed quaternary-type adducts in which there are present a corresponding plurality of phosphonium groups. Thus, the reaction of hexamethylphosphorous triamide with a compound having two sets of activating chlorine atoms, e. g., hexachloroethane or 1,3-dichloropropanone-2, may yield a diphosphonium compound of the structure

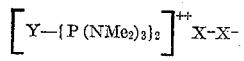

The general formula of the present quaternary type adducts may thus be given as

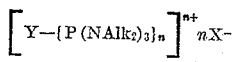

in which $n$ is an integer of from 1 to 8.

Characterization of the adduct with respect to quaternary structure may generally be effected by simply noting the water-solubility of the product, the phosphonium halides being extremely water-soluble. Although generally the products appear to be quaternary phosphonium salts, this is not always the case. A specific example is the reaction of hexamethylphosphorous triamide with hexachlorocyclopentadiene, in which case a colored water-insoluble adduct of unknown structure was formed.

The usefulness of the present adducts is related to whether or not they are quaternary salts. The phosphonium halides, being water-soluble, are best suited to those uses in which such solubility is desirable. The water-insoluble adducts, on the other hand, are best adapted for uses in which water-resistance is important. Usefulness of the present adducts likewise depends upon the type of halogen present as well as upon the presence or absence of such groups as the carbonyl or carboxylate groups. Phosphonium halides containing only chlorine as the halogen are generally useful as bacteriostats, pharmaceuticals, and as plant-growth regulators. Those which contain fluorine in addition to chlorine or bromine find use as rodenticides and insecticides. The water-insoluble adducts may be used as lubricant additives, fungicides and biological toxicants in general, as textile-treating agents, fire-proofing agents, etc.

Formation of the present adducts takes place by contacting the organic chlorine compound with the hexaalkylphosphorous triamide and allowing the resulting reaction mixture to stand under ordinary, decreased, or increased temperature and pressure conditions, depending upon the nature of the individual reactants. In most instances, formation of the adducts takes place rapidly. Initiation of the reaction is usually evidenced by the formation of an oil or white solid in the reaction mixture and in many cases by evolution of reaction heat; this may occur as soon as even a very small portion of one reactant has been added to the other. Thus, during the gradual introduction of hexamethylphosphorous triamide to fluorotrichloromethane at room temperature, almost immediately after the first drop of the triamide has been added, a finely divided precipitate of the adduct begins to form and evolution of heat is noted. Precipitation continues until a stoichiometric quantity of the triamide has been added. If desired, the reaction temperature may be kept low by external cooling and a mixture of the two reactants allowed to stand at the lower temperatures until reaction is complete. In order to dissipate reaction heat, it is often advantageous to operate in the presence of an inert organic solvent or diluent when working with the highly reactive compounds. Such solvents or diluents may be, e. g., ethyl ether, dioxane, toluene, benzene, hexane, etc. An excess of either reactant and gradual introduction of the reactants also result in effecting smoother operation. With those reactants which demonstrate no reaction heat or other evidence of adduct formation upon mixing, operation at increased temperature in the presence or absence of superatmospheric pressure will result in the addition reaction. With such less reactive organic chlorine compounds, it is generally advisable to work in the absence of a solvent. Temperatures of up to the refluxing temperature of the reaction mixture may be used; or if it is desired to accelerate a reaction which appears to be sluggish at even the refluxing temperature, or when the organic chlorine compound is a low-boiling compound such as chloroform, the reaction may be effected in a closed vessel, e. g., an autoclave or a Carius tube. With each new run it is recommended that reaction first be attempted at ordinary temperatures, with gradual introduction of one reactant to the other, before employing the more extreme condition, i. e., before application of external heating and/or superatmospheric pressure. Such a trial experiment will indicate to those skilled in the art whether optimum reaction conditions for attaining smooth conversion in good yields will require control through use of diluents and/or cooling, or whether means for accelerating the addition reaction by heating and/or the use of added pressure will be needed.

The present adducts are readily separated from the reaction mixture by usual isolating procedures. When a diluent or solvent is employed in the reaction, the precipitated adduct is recovered by simply filtering it, if a solid, or decanting from it, if an oil, washing it with a non-solvent, and drying, taking great pains to avoid contact with water since many of the products of this invention are extremely deliquescent. When no solvent or diluent is employed, the reaction product is generally a solid mass of the crystalline adduct.

Further details of the invention are set forth with respect to the following specific examples:

Example 1

To an ice-cooled solution of 41.2 g. (0.30 mole) of fluorotrichloromethane in 100 cc. of ethyl ether there was added, during 30 minutes, a solution of 40.8 g. (0.25 mole) of hexamethylphosphorous triamide in 100 cc. of ether. There was moderate evolution of heat and a white precipitate gradually settled out. After reaction appeared to be completed, as evidenced by cessation of both precipitation and heat evolution, the reaction mixture was allowed to stand at room temperature for several days. The reaction mixture was then filtered to give a light tan precipitate, which after rinsing several times with ether, was transferred to a vacuum desiccator. There was thus obtained about 70 grams of the very water-soluble dichlorofluoromethyltris(dimethylamino)-phosphonium chloride analyzing as follows:

|  | Found | Calcd. for $C_7H_{18}N_3PCl_2F$ |
|---|---|---|
| Percent ionic Cl | 12.70 | 11.79 |
| Percent Total Cl | 33.8 | 35.40 |
| Percent N | 13.98 | 13.98 |
| Percent P | 9.66 | 10.31 |

Example 2

An ether solution of hexamethylphosphorous triamide was added, at room temperature, to an ether solution of a mixture of fluorochloroalkanes known to the trade as "Freon 112" and consisting of 1,1-difluorotetrachloroethane (75%) and 1,2-difluorotetrachloroethane (25%). There was immediate precipitation of a mixture of the white, solid phosphonium chlorides probably including 1,1 - difluorotrichloroethyltris(dimethylamino)phosphonium chloride and 1,2-difluorotrichloroethyltris(dimethylamino)phosphonium chloride.

Example 3

Hexamethylphosphorous triamide was mixed in ether solution with substantially an equal amount by volume of hexachlorocyclopentadiene. There was an almost immediate, vigorous exothermic reaction, the reaction mixture turned purple, and a deep purple, sticky solid was formed. The solid, insoluble in water (even in hot water), slightly soluble in hexane and completely soluble in acetone and benzene, was a hexamethylphosphorous triamide-hexachlorocyclopentadiene adduct of possibly non-quaternary type which was advantageously employed as a biological toxicant.

Example 4

Hexamethylphosphorous triamide was respectively mixed with substantially equal amounts by volume of each of the following compounds. Reactions were effected in ether solution without application of external heat. The adducts obtained are characterized in the following table:

|  | Adduct |
|---|---|
| Carbon tetrachloride | white, water-soluble, deliquescent solid. |
| 1,1,1-trichloro-3-nitro-2-propanol | orange oil. |
| Hexachloroethane | white solid. |
| Chloral | oil. |
| 1-chloro-1-nitroethane | yellow oil. |
| sym-Dichloroacetone | oil. |
| 1,1-dichloro-1-nitropropane | orange oil. |
| α,α,β-Trichloropropionitrile | solid precipitate. |
| Ethyl trichloroacetate | quickly crystallizing oil. |
| Ethyl dichloroacetate | slow reaction; needles. |
| Benzotrichloride | slow reaction; oily precipitate. |
| Ethyl chloroacetate | slow reaction; needles. |
| 1,2-dichlorooctafluoro-1,2-cyclohexene. | oily solid; chloride-positive. |
| Phenacyl chloride | slow deposit of oil. |

Example 5

Although carbon tetrachloride reacts very readily with hexamethylphosphorous triamide in the cold to give a white, solid adduct, chloroform was not found to be so reactive. Hence in order to obtain a good yield of the 1:1 chloroform-hexamethylphosphorous triamide adduct, an equimolar mixture of the chloroform and the amide was heated in a closed vessel at approximately 100° C. for 3 hours. After cooling, the resulting reaction product was washed with ether to recover any unreacted material, both of the initial reactants being ether-soluble. Very little material was thus removed. The residue, a water-soluble liquid, comprised the substantially pure chloroform - hexamethylphosphorous triamide adduct, analyzed 15.93% nitrogen as against 14.9%, the calculated nitrogen value for the adduct.

Example 6

Hexaethylphosphorous triamide was reacted with various active-chlorine-containing compounds as in Example 4. The adducts obtained are characterized in the following table:

|  | Adduct |
|---|---|
| Carbon tetrachloride | grayish-white solid. |
| Hexachloroethane | white solid. |
| Ethyl trichloroacetate | Do. |
| sym-Dichloroacetone | yellow oil. |
| Hexachlorocyclopentadiene | purple, water-insoluble solid. |

This invention makes available a new class of nitrogenous organic compounds of phosphorus. The new adducts are easily prepared, no special precautions with respect to reactant quantities and reactant conditions being necessary. They are thus easily adapted to large scale manufacture. Both the solid and oily adducts are readily recovered from the reaction mixtures if reasonable precaution against access of moisture are taken. The crystalline adducts are particularly well-adapted for biological and agricultural uses. Moreover, it is possible to convert many previously known liquid, water-insoluble biologically inactive, halogen-containing compounds into water-soluble, crystalline solids of pronounced biological activity by the present invention.

The above description and samples are intended to be illustrative only. Any modification of or variation therefrom which conforms to the spirit of the invention is intended to be included within the scope of the claims.

This application is a continuation-in-part of our copending application Serial No. 277,546, filed March 19, 1952, now abandoned.

What we claim is:

1. An adduct of hexamethylphosphorous triamide and carbon tetrachloride, said adduct being prepared by contacting the carbon tetrachloride with said triamide.

2. 1,1 - difluorotrichloroethyltris(dimethylamino)phosphonium chloride.

3. An adduct of hexamethylphosphorous triamide and 1,1-difluorotetrachloroethane, said adduct being prepared by contacting the difluorotetrachloroethane with the triamide.

4. An adduct of hexamethylphosphorous triamide and hexachlorocyclopentadiene, said adduct being prepared by contacting the hexacholorocyclopentadiene with the triamide.

5. An adduct of hexamethylphosphorous triamide and hexachloroethane, said adduct being prepared by contacting the hexachloroethane with the triamide.

6. An adduct of hexamethylphosphorous triamide with a polyhalogenated hydrocarbon selected from the class consisting of carbon tetrachloride, 1,1-difluorotetrachloroethane, 1,2-difluorotetrachloroethane, fluorotrichloromethane, hexachlorocyclopentadiene, hexachloroethane, benzotrichloride and 1,2-dichlorooctafluoro-1,2-cyclohexene, said adduct being prepared by contacting the halogenated hydrocarbon with the triamide.

References Cited in the file of this patent

UNITED STATES PATENTS

| | | |
|---|---|---|
| 1,990,609 | Meis | Feb. 12, 1935 |
| 2,146,584 | Lipkin | Feb. 7, 1939 |
| 2,160,841 | Dreyfus | June 6, 1939 |
| 2,703,813 | Dye | Mar. 8, 1955 |

FOREIGN PATENTS

| | | |
|---|---|---|
| 201,549 | Switzerland | Mar. 1, 1939 |

OTHER REFERENCES

Michaelis et al.: "Ber. deut. Chem.," vol. 28 (1895), pp. 2205–11.

Michaelis: "Liebigs Annalen," vol. 326 (1903), pp. 169 and 170.

Kosolapoff: "Organo-Phosphorus Compounds," October 12, 1950, pp. 326 and 327.